(12) United States Patent
Todd

(10) Patent No.: US 11,514,140 B2
(45) Date of Patent: Nov. 29, 2022

(54) METHOD AND SYSTEM FOR POST-PURCHASE DATA USAGE AND LICENSE ENFORCEMENT

(71) Applicant: EMC IP Holding Company LLC, Hopkinton, MA (US)

(72) Inventor: Stephen James Todd, North Conway, NH (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 564 days.

(21) Appl. No.: 16/523,234

(22) Filed: Jul. 26, 2019

(65) Prior Publication Data

US 2021/0026933 A1 Jan. 28, 2021

(51) Int. Cl.
  *G06F 21/12* (2013.01)
  *G06Q 30/02* (2012.01)
  *G06F 21/10* (2013.01)

(52) U.S. Cl.
  CPC .......... *G06F 21/121* (2013.01); *G06F 21/105* (2013.01); *G06Q 30/0201* (2013.01); *G06F 2221/0757* (2013.01)

(58) Field of Classification Search
  CPC .............. G06F 21/121; G06F 21/105; G06F 2221/0757; G06F 16/5866; G06F 16/23; G06F 16/93; G06F 16/254; G06Q 30/0201
  See application file for complete search history.

(56) References Cited

U.S. PATENT DOCUMENTS

| | | | | |
|---|---|---|---|---|
| 5,915,019 | A * | 6/1999 | Ginter | G06Q 40/12 705/26.1 |
| 7,634,520 | B1 * | 12/2009 | Seiler | G06F 16/219 707/999.102 |
| 7,805,415 | B1 * | 9/2010 | Flesher | H04L 63/12 707/738 |
| 9,015,832 | B1 * | 4/2015 | Lachwani | G06F 21/577 726/22 |
| 9,641,486 | B1 * | 5/2017 | Jauhal | G06F 11/1464 |
| 10,523,526 | B2 * | 12/2019 | Dementev | G06F 21/64 |
| 10,686,647 | B1 * | 6/2020 | Kondapalli | H04L 41/0246 |
| 2004/0039741 | A1 * | 2/2004 | Benson | G06F 21/10 707/999.009 |
| 2006/0107334 | A1 * | 5/2006 | Leone | G06F 21/10 726/27 |

(Continued)

OTHER PUBLICATIONS

M. Kumar, A. K. Singh and T. V. Suresh Kumar, "Secure Log Storage Using Blockchain and Cloud Infrastructure," 2018 9th International Conference on Computing, Communication and Networking Technologies (ICCCNT), 2018, pp. 1-4, doi: 10.1109/ICCCNT.2018.8494085.*

(Continued)

*Primary Examiner* — David Garcia Cervetti
(74) *Attorney, Agent, or Firm* — Chamberlain, Hrdlicka, White, Williams & Aughtry

(57) ABSTRACT

In general, the invention relates to a method for managing data. The method includes obtaining a data set from a local data system, identifying an audit tag associated with the data set, generating a table entry for a data registration table based on the data set and the audit tag, and storing the table entry in the data registration table, wherein the data registration table is stored in a data tracking service.

14 Claims, 16 Drawing Sheets

(56) References Cited

U.S. PATENT DOCUMENTS

| | | | |
|---|---|---|---|
| 2006/0184543 A1* | 8/2006 | Fukuta | H04N 1/00244 |
| 2012/0179646 A1* | 7/2012 | Hinton | G06F 16/25 707/607 |
| 2013/0097055 A1* | 4/2013 | Kramer | G06Q 30/00 705/26.25 |
| 2014/0019758 A1* | 1/2014 | Phadke | H04N 21/4627 713/168 |
| 2014/0237625 A1* | 8/2014 | Zatsepin | G06F 21/105 726/28 |
| 2015/0088834 A1* | 3/2015 | Wright, Sr. | G06F 16/2379 707/689 |
| 2015/0089670 A1* | 3/2015 | Yanagawa | H04L 63/0876 726/28 |
| 2015/0095237 A1* | 4/2015 | Naik | G06Q 10/10 705/59 |
| 2015/0096059 A1* | 4/2015 | Naik | G06F 21/121 726/30 |
| 2015/0294093 A1* | 10/2015 | Yabe | G06F 21/105 726/26 |
| 2017/0046709 A1* | 2/2017 | Lee | G06Q 10/1097 |
| 2017/0116693 A1* | 4/2017 | Rae | G06Q 50/184 |
| 2017/0134161 A1* | 5/2017 | Goeringer | G06Q 20/065 |
| 2017/0337534 A1* | 11/2017 | Goeringer | G06Q 50/184 |
| 2018/0068091 A1* | 3/2018 | Gaidar | G06F 21/10 |
| 2018/0089256 A1* | 3/2018 | Wright, Sr. | G06Q 20/1235 |
| 2018/0107838 A1* | 4/2018 | Amarendran | G06F 11/1448 |
| 2018/0183687 A1* | 6/2018 | Dementev | H04L 41/50 |
| 2018/0218131 A1* | 8/2018 | Boudreau | G06F 21/105 |
| 2018/0253261 A1* | 9/2018 | Kripalani | G06F 3/0659 |
| 2018/0285996 A1* | 10/2018 | Ma | H04L 9/3297 |
| 2018/0287893 A1* | 10/2018 | O'Brien | H04L 12/1403 |
| 2018/0314809 A1* | 11/2018 | Mintz | H04L 9/3297 |
| 2018/0322259 A1* | 11/2018 | Solow | G06F 21/645 |
| 2018/0329693 A1* | 11/2018 | Eksten | G06F 8/65 |
| 2018/0374173 A1* | 12/2018 | Chen | G06Q 10/10 |
| 2019/0132350 A1* | 5/2019 | Smith | G06F 21/577 |
| 2019/0155997 A1* | 5/2019 | Vos | H04L 9/0637 |
| 2019/0158594 A1* | 5/2019 | Shadmon | H04L 67/01 |
| 2019/0229890 A1* | 7/2019 | Brehmer | H04L 9/088 |
| 2019/0236214 A1* | 8/2019 | Kokernak | G06F 16/1734 |
| 2019/0279257 A1* | 9/2019 | Kokernak | G06Q 30/0277 |
| 2019/0286794 A1* | 9/2019 | Jose | G06F 21/105 |
| 2019/0287146 A1* | 9/2019 | Maitland | H04L 41/12 |
| 2019/0303542 A1* | 10/2019 | Fraser | H04W 4/025 |
| 2019/0318348 A1* | 10/2019 | Brenner | G06Q 50/184 |
| 2019/0349426 A1* | 11/2019 | Smith | H04L 63/123 |
| 2019/0373472 A1* | 12/2019 | Smith | H04W 4/38 |
| 2019/0384892 A1* | 12/2019 | Holland | G06F 21/105 |
| 2019/0392119 A1* | 12/2019 | Rahiman | G06F 21/105 |
| 2020/0014527 A1* | 1/2020 | Subramaniam | H04L 63/00 |
| 2020/0074048 A1* | 3/2020 | Subramaniam | H04L 63/1425 |
| 2020/0134139 A1* | 4/2020 | Vaish | G06F 21/64 |
| 2020/0142965 A1* | 5/2020 | Weldemariam | G06F 16/27 |
| 2020/0151266 A1* | 5/2020 | Takeuchi | G06F 16/2379 |
| 2020/0183917 A1* | 6/2020 | Duchastel | G06F 16/9024 |
| 2020/0242595 A1* | 7/2020 | Harrison | H04L 67/1097 |
| 2020/0250176 A1* | 8/2020 | Padmanabhan | G06F 16/27 |
| 2020/0250177 A1* | 8/2020 | Padmanabhan | G06F 16/27 |
| 2020/0250295 A1* | 8/2020 | Padmanabhan | G06F 21/64 |
| 2020/0250747 A1* | 8/2020 | Padmanabhan | G06N 5/04 |
| 2020/0252205 A1* | 8/2020 | Padmanabhan | H04L 9/0643 |
| 2020/0252404 A1* | 8/2020 | Padmanabhan | G06F 16/2308 |
| 2020/0252406 A1* | 8/2020 | Padmanabhan | H04L 9/0891 |
| 2020/0258166 A1* | 8/2020 | Cross | H04L 9/006 |
| 2020/0265150 A1* | 8/2020 | Bode | G06F 21/6209 |
| 2020/0278915 A1* | 9/2020 | Degaonkar | H04L 41/069 |
| 2020/0285716 A1* | 9/2020 | Punathil | G06F 16/243 |
| 2020/0313878 A1* | 10/2020 | Wang | G06F 16/1734 |
| 2020/0349238 A1* | 11/2020 | Tyagi | H04L 41/04 |
| 2020/0364188 A1* | 11/2020 | Hintermeister | G06F 16/122 |
| 2020/0364358 A1* | 11/2020 | Karia | H04L 63/10 |
| 2020/0387585 A1* | 12/2020 | Martinez | G06F 21/12 |
| 2021/0065324 A1* | 3/2021 | Zhao | G06Q 50/184 |

OTHER PUBLICATIONS

A. Ahmad, M. Saad, L. Njilla, C. Kamhoua, M. Bassiouni and A. Mohaisen, "BlockTrail: A Scalable Multichain Solution for Blockchain-Based Audit Trails," ICC 2019—2019 IEEE International Conference on Communications (ICC), 2019, pp. 1-6, doi: 10.1109/ICC.2019.8761448.*

Ahmad, Ashar & Saad, Muhammad & Mohaisen, David. (Jul. 21, 2019). Secure and transparent audit logs with BlockAudit. Journal of Network and Computer Applications. 145. 102406. 10.1016/j.jnca.2019.102406.*

* cited by examiner

METHOD AND SYSTEM FOR POST-PURCHASE DATA USAGE AND LICENSE ENFORCEMENT

BACKGROUND

Computing devices may include any number of internal components such as processors, memory, and persistent storage. Each of the internal components of a computing device may be used to generate data and to execute functions. The process of generating, storing, and sending data may utilize computing resources of the computing devices such as processing and storage.

SUMMARY

In general, the invention relates to a method for managing data. The method includes obtaining a data set from a local data system, identifying an audit tag associated with the data set, generating a table entry for a data registration table based on the data set and the audit tag, and storing the table entry in the data registration table, wherein the data registration table is stored in a data tracking service.

In general, the invention relates to non-transitory computer readable medium which includes computer readable program code, which when executed by a computer processor enables the computer processor to perform a method for managing data. The method includes obtaining a data set from a local data system, identifying an audit tag associated with the data set, generating a table entry for a data registration table based on the data set and the audit tag, and storing the table entry in the data registration table, wherein the data registration table is stored in a data tracking service.

In general, the invention relates to a system that includes a processor and memory comprising instructions, which when executed by the processor perform a method for managing data. The method includes obtaining a data set from a local data system, identifying an audit tag associated with the data set, generating a table entry for a data registration table based on the data set and the audit tag, and storing the table entry in the data registration table, wherein the data registration table is stored in a data tracking service.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing license agreements. More specifically, embodiments of the invention include using a data management system to obtain the license agreements between clients and local data systems that provide licensed data. Embodiments of the invention may include methods for allowing the local data systems to determine whether to provide the data to the clients based on the license agreements and, if permitted, provide data to the client with one or more audit tags.

Further, embodiments of the invention include functionality for auditing compliance with data usage associated with the license agreements using a data tracking service. The data tracking service may store information about data obtained by a client and whether the client's usage of the data is in compliance with the license agreement. A local data system, or another entity, may interact with the data tracking service to obtain log entries that each specify usage information about a data set.

Embodiments of the invention may further include using the audit terms (e.g., data usage manager) to enforce that the data usage is in compliance (or otherwise consistent) with the license agreement. A data usage manager may be installed in the client to manage the data usage in the client.

Figure 1A:
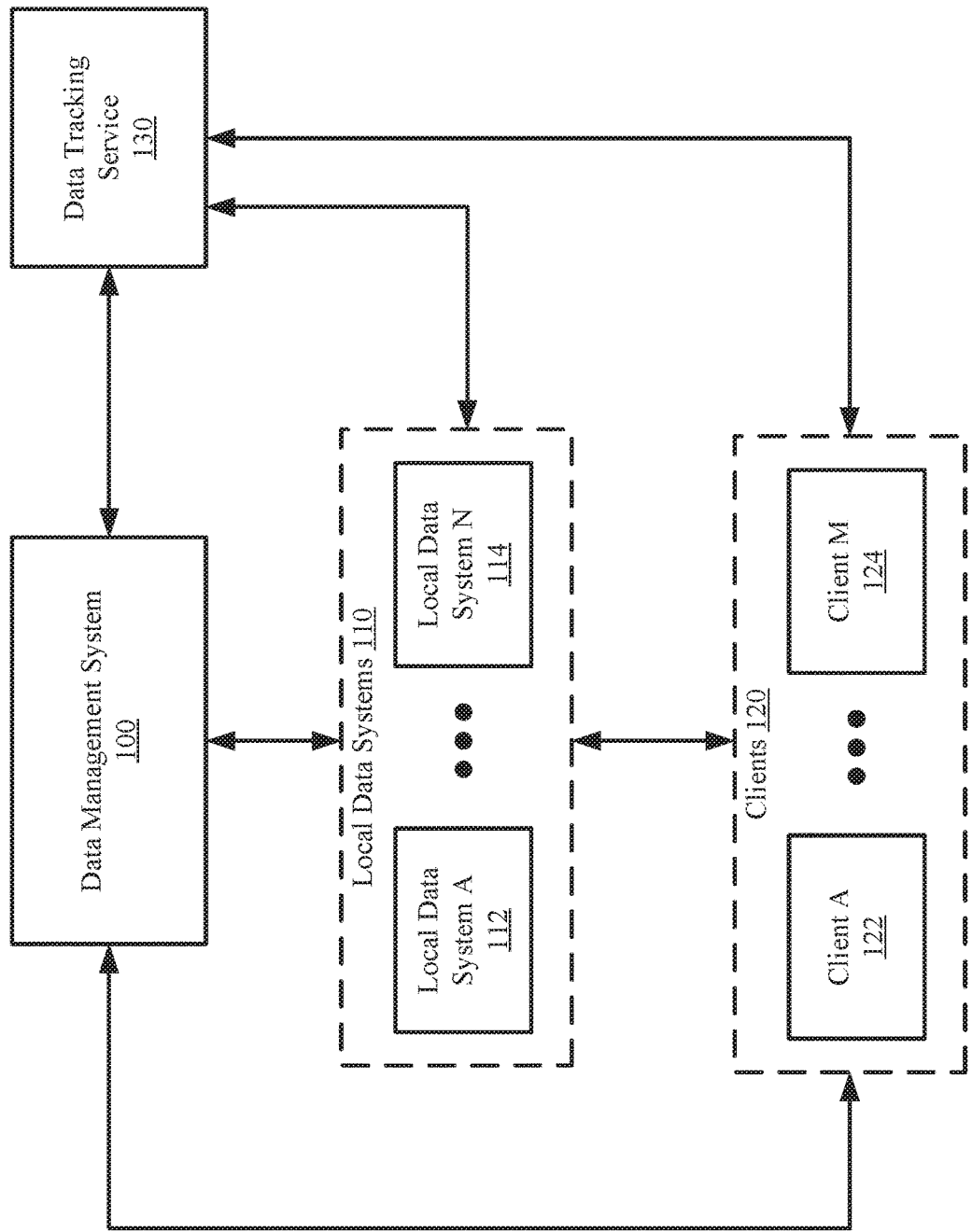
FIG. 1A shows a diagram of a system in accordance with one or more embodiments of the invention.

FIG. 1A shows a diagram of a system in accordance with one or more embodiments of the invention. The system includes a data management system (100), local data systems (110), clients (120), and a data tracking service. Each component of the system may be operably connected via any combination of wired and/or wireless connections. The system may include additional, fewer, and/or different components without departing from the invention. Each component of the system illustrated in FIG. 1A is discussed below.

In one or more embodiments of the invention, the data management system (100) is a device that manages data. The data may be provided by a local data system (112, 114). The data management system may facilitate the management of data by storing information that specifies the data that may be sent from the local data system (110) to the clients (120). The information may be, for example, a license agreement that specifies accepted terms by the clients (120) following transactions taking place between the clients (120) and the data management system (100).

In one or more embodiments of the invention, the communication between the data management system (100) and the clients (120) includes participating in any type of distributed transaction ledger, e.g., blockchain based transaction, to complete the acceptance of the terms. A distributed transaction ledger may be a program executed by the data management system (100) and/or other entities that creates a record of and/or enforces agreed upon transactions. The record generated by the distributed transaction ledger may be a data structure that is distributed across any number of entities which creates an immutable record of each transaction processed by the distributed transaction ledger. The data management system (100) may complete transactions via methods other than participation in a distributed transaction ledger without departing from the invention.

In one or more embodiments of the invention, the data management system (100) facilitates transactions using smart contracts. A smart contract may be a program executing via a distributed transaction ledger (not shown) that facilitates the exchange of a currency (e.g., bitcoins) supported by the distributed transaction ledger. Upon execution of a smart contract, the smart contract may automatically exchange the currency and any access information (discussed below) between the parties that entered into the smart contract.

Figure 4:
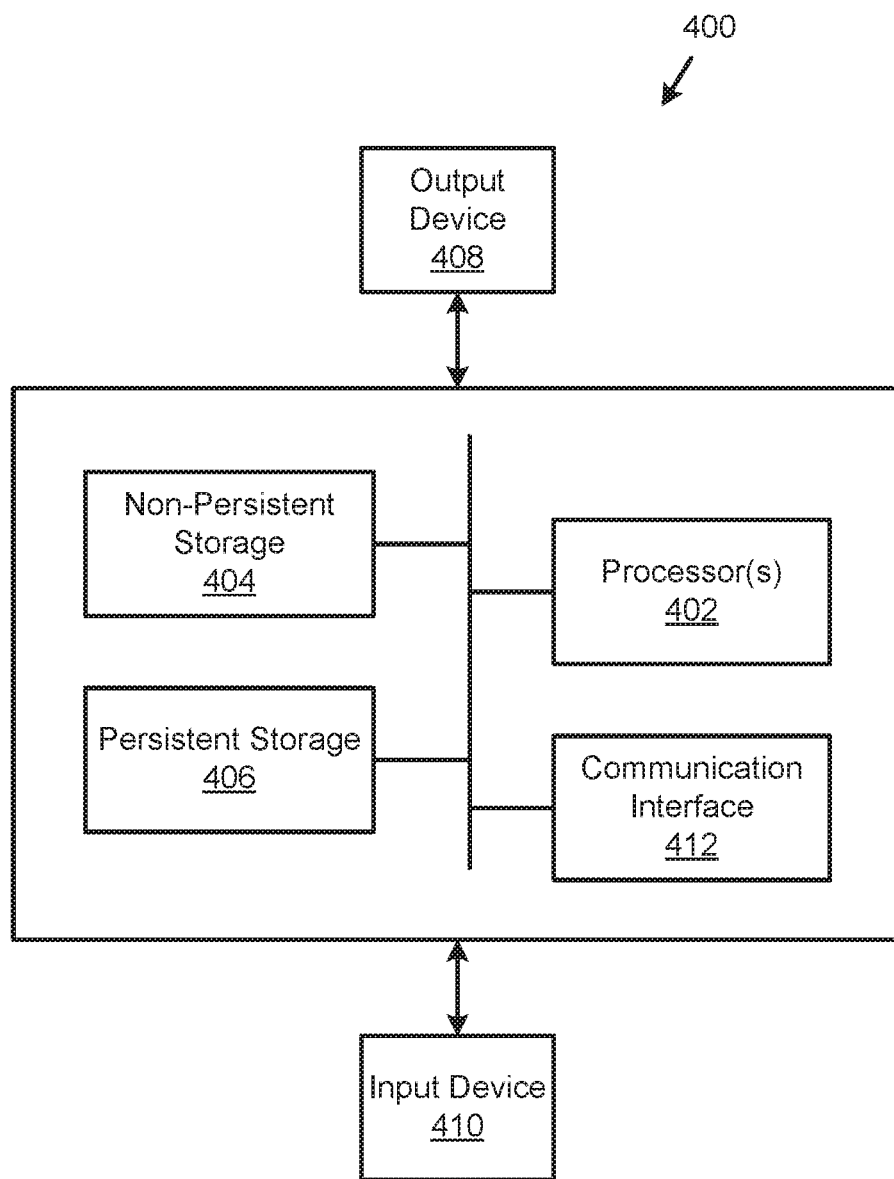
FIG. 4 shows a diagram of a computing device in accordance with one or more embodiments of the invention.

In one or more embodiments of the invention, the data management system (100) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the data management system (100) described in this application and/or all, or portion, of the methods illustrated in FIG. 2A.

The data management system (100) may be implemented as a logical device without departing from the invention. The logical device utilizes computing resources of any number of physical computing devices to provide the functionality of the data management system (100) described throughout this application and/or all, or portion, of the methods illustrated in FIG. 2A. For additional details regarding the data management system, see, e.g., FIG. 1C.

In one or more embodiments of the invention, the local data systems (110) are systems that obtain data, store data, provide data, and/or execute applications based on the stored data. The local data systems (110) may provide the stored data and/or applications to the clients (120) as specified by terms agreed to by the clients (120) based on transactions between the clients (120) and the local data systems (110).

In one or more embodiments of the invention, each local data system (110) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the local data system (110) described throughout this application and/or all, or portion, of the method illustrated in FIG. 2B.

A local data system (112, 114) may be implemented as a logical device without departing from the invention. The logical device utilizes computing resources of any number of physical computing devices to provide the functionality of the local data system (112, 114) described throughout this application and/or all, or portion, of the method illustrated in FIG. 2B. For additional details regarding a local data system (112, 114), see, e.g., FIG. 1B.

In one or more embodiments of the invention, the clients (120) may utilize computing resources and/or access data of the local data systems (110) based on terms (e.g., license agreements) established between the clients (120) and the local data systems (110). The clients (120) may communicate with the data management system (100) to agree upon terms for accessing the data.

In one or more embodiments of the invention, a client (122, 124) obtains the data from the local data systems (110) and uses the data in accordance with the agreed-upon terms. The clients (120) may track the usage of the data using the data tracking service (130) (which may be internal to or external to the client, discussed below). The clients (120) may update the data tracking service with entries that specify how the data was used by the clients (120) and may further specify whether the clients (120) complied with the agreed-upon terms.

In one or more embodiments of the invention, each client (122, 124) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the client (122, 124) described throughout this application.

A client (122, 124) may be implemented as a logical device without departing from the invention. The logical device utilizes computing resources of any number of physical computing devices to provide the functionality of the client (122, 124) described throughout this application and/or all, or portion, of the method illustrated in FIGS. 2C, 2D, and 2E. For additional details regarding a client (122, 124), see, e.g., FIG. 1D.

In one or more embodiments of the invention, a data tracking service (130) is a service that tracks how data is used and/or accessed by a client (122, 124). The information in the data tracking service may be specified by the clients (120) and may be accessed by the data management system (100), the clients (120), and/or the local data systems (110).

In one or more embodiments of the invention, the data tracking service (130) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the data tracking service (130) described throughout this application and/or all, or portion, of the method illustrated in FIG. 2F.

Figure 2A:
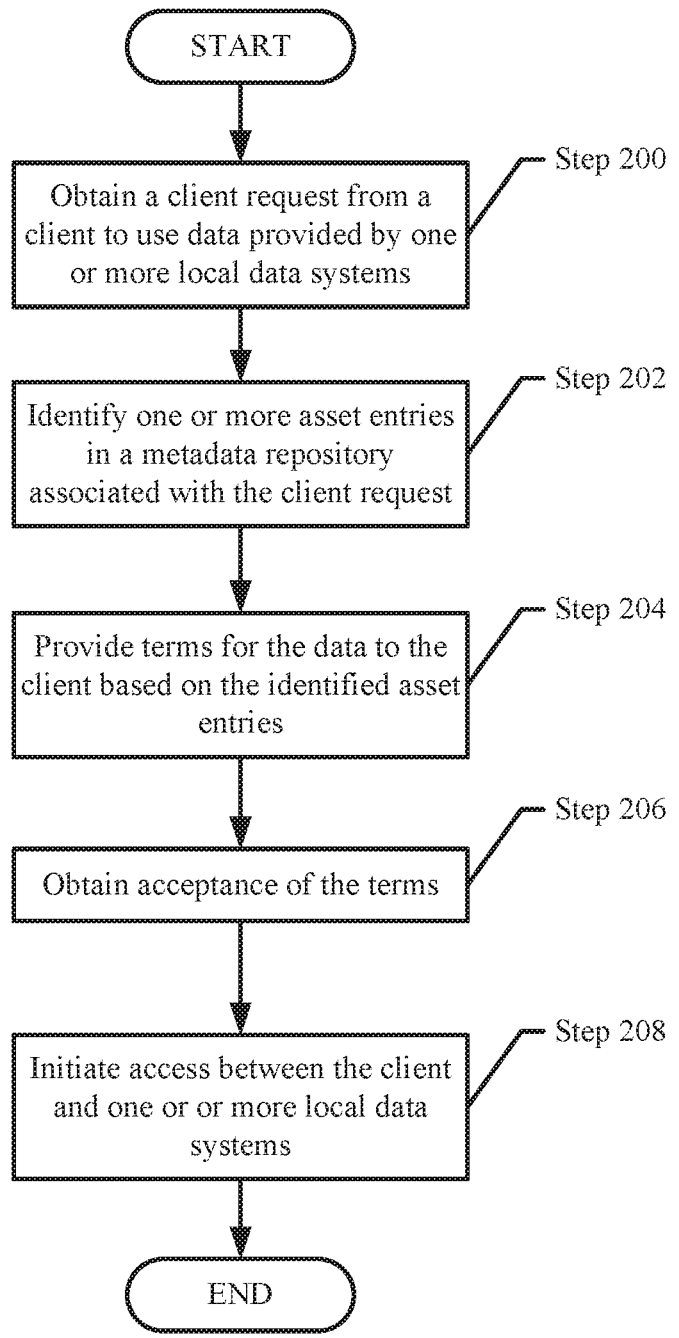
FIG. 2A shows a flowchart for obtaining license agreements in accordance with one or more embodiments of the invention.
Figure 2B:
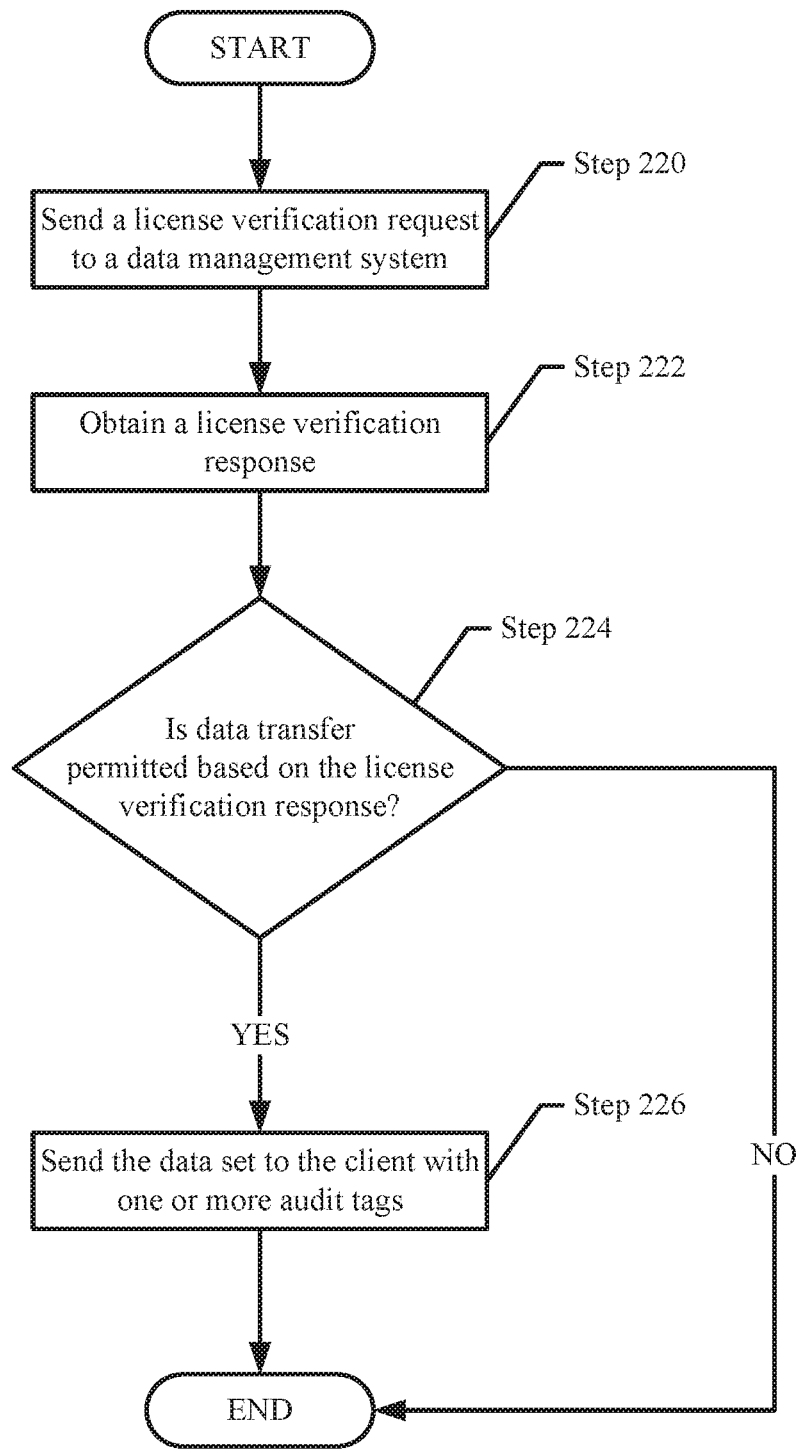
FIG. 2B shows a flowchart for managing data use operations in accordance with one or more embodiments of the invention.
Figure 2C:
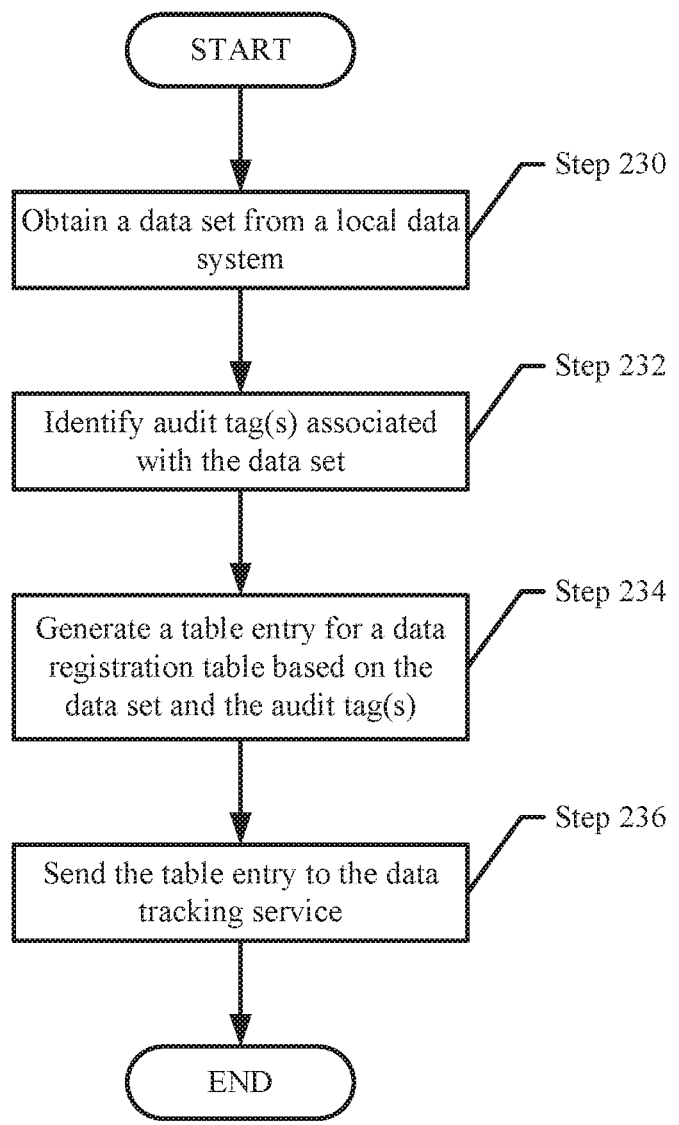
FIG. 2C shows a flowchart for managing obtained licensed data in accordance with one or more embodiments of the invention.
Figure 2D:
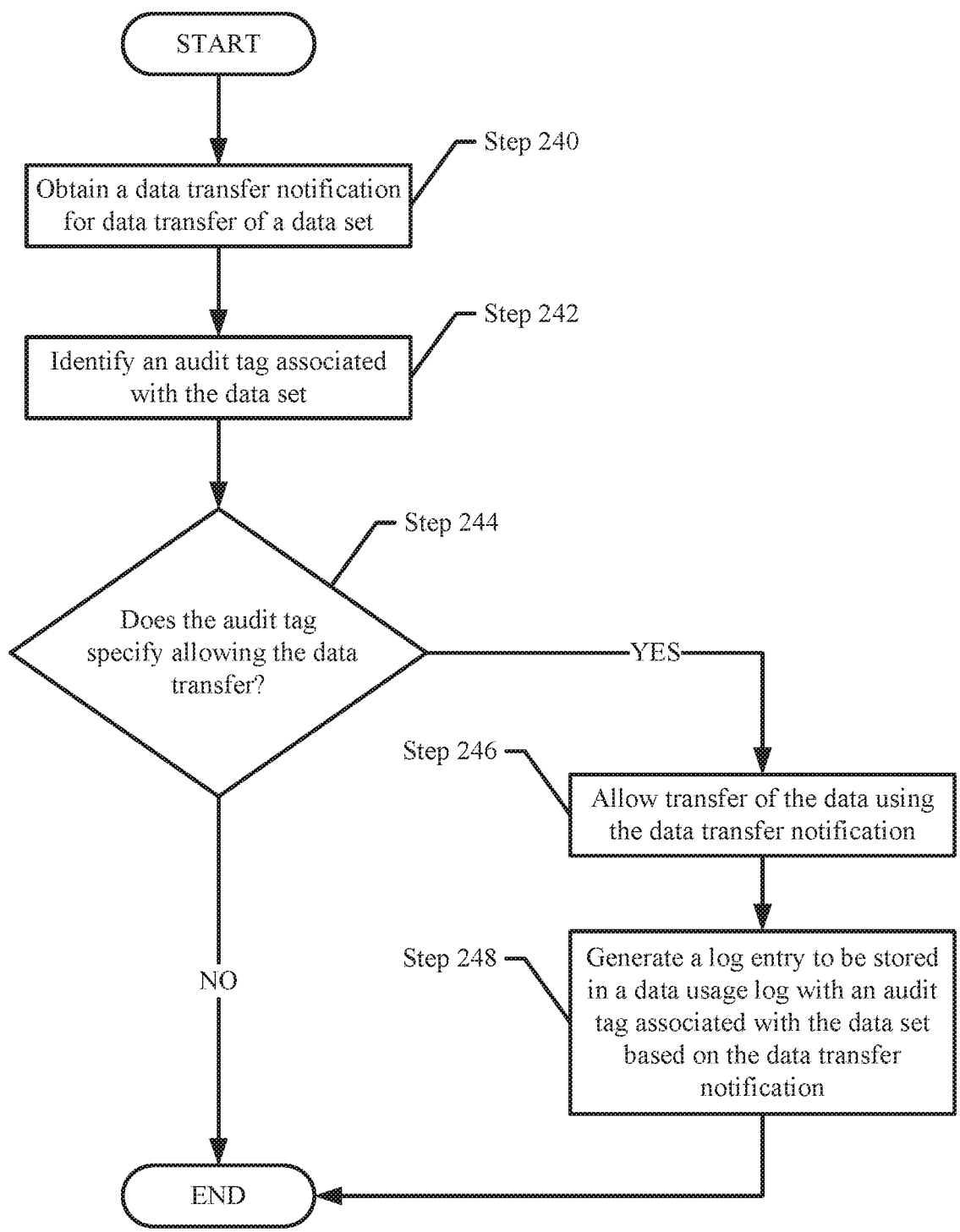
FIG. 2D shows a flowchart for managing data usage of licensed data in accordance with one or more embodiments of the invention.
Figure 2E:
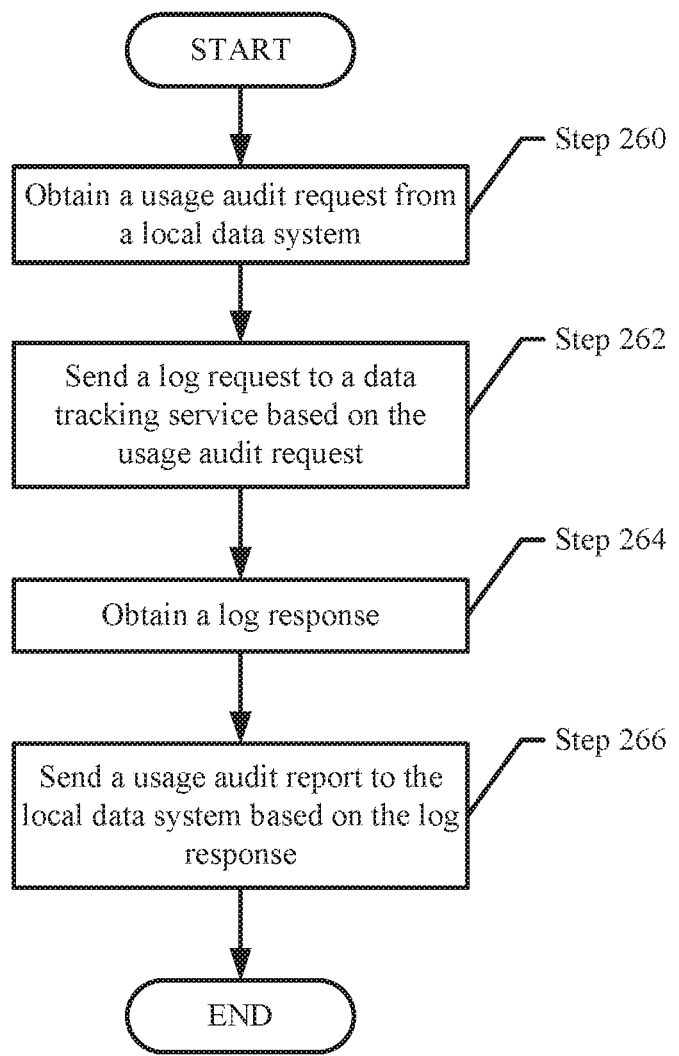
FIG. 2E shows a flowchart for managing usage audit requests in accordance with one or more embodiments of the invention.
Figure 2F:
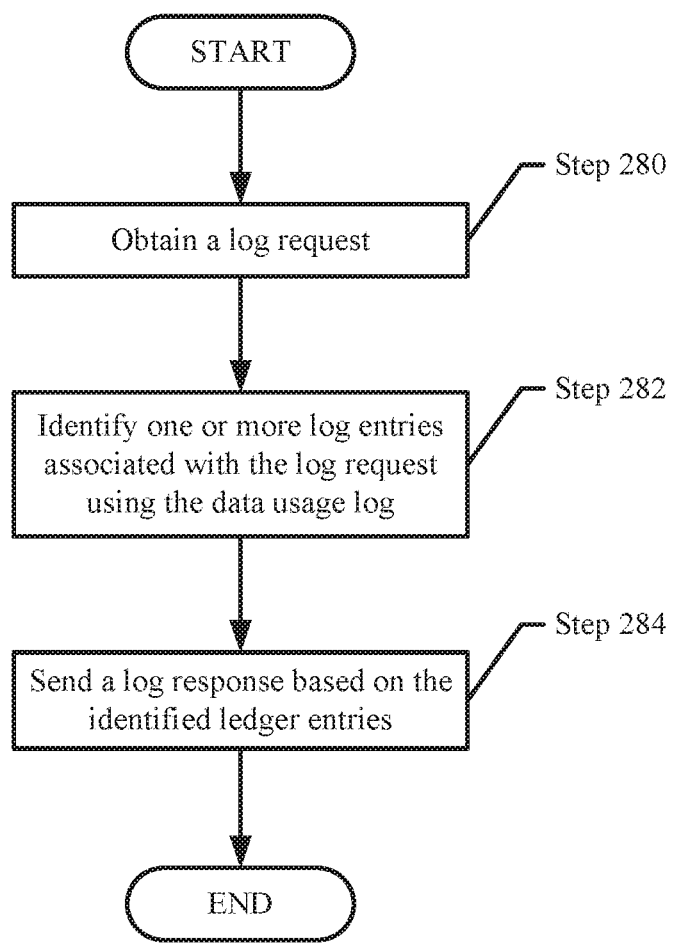
FIG. 2F shows a flowchart for managing log requests in accordance with one or more embodiments of the invention.

In one or more embodiments of the invention, the data tracking service (130) is implemented as computing code stored on a persistent storage of a client (122, 124) that when executed by a processor of a client (122, 124) performs the functionality of the data tracking service (130) described throughout this application and/or all, or portion, of the method illustrated in FIG. 2F. The processor may be a hardware processor including circuitry such as, for example, a central processing unit or a microcontroller. The processor may be other types of hardware devices for processing digital information without departing from the invention.

In one or more embodiments of the invention, the data tracking service (130) is implemented as a distributed ledger (e.g., a blockchain). The logical device may utilize computing resources of any number of physical computing devices to provide the functionality of the data tracking service (130) described throughout this application and/or all, or portion, of the method illustrated in FIG. 2F. For additional details regarding the data tracking service, see, e.g., FIG. 1E.

Figure 1B:
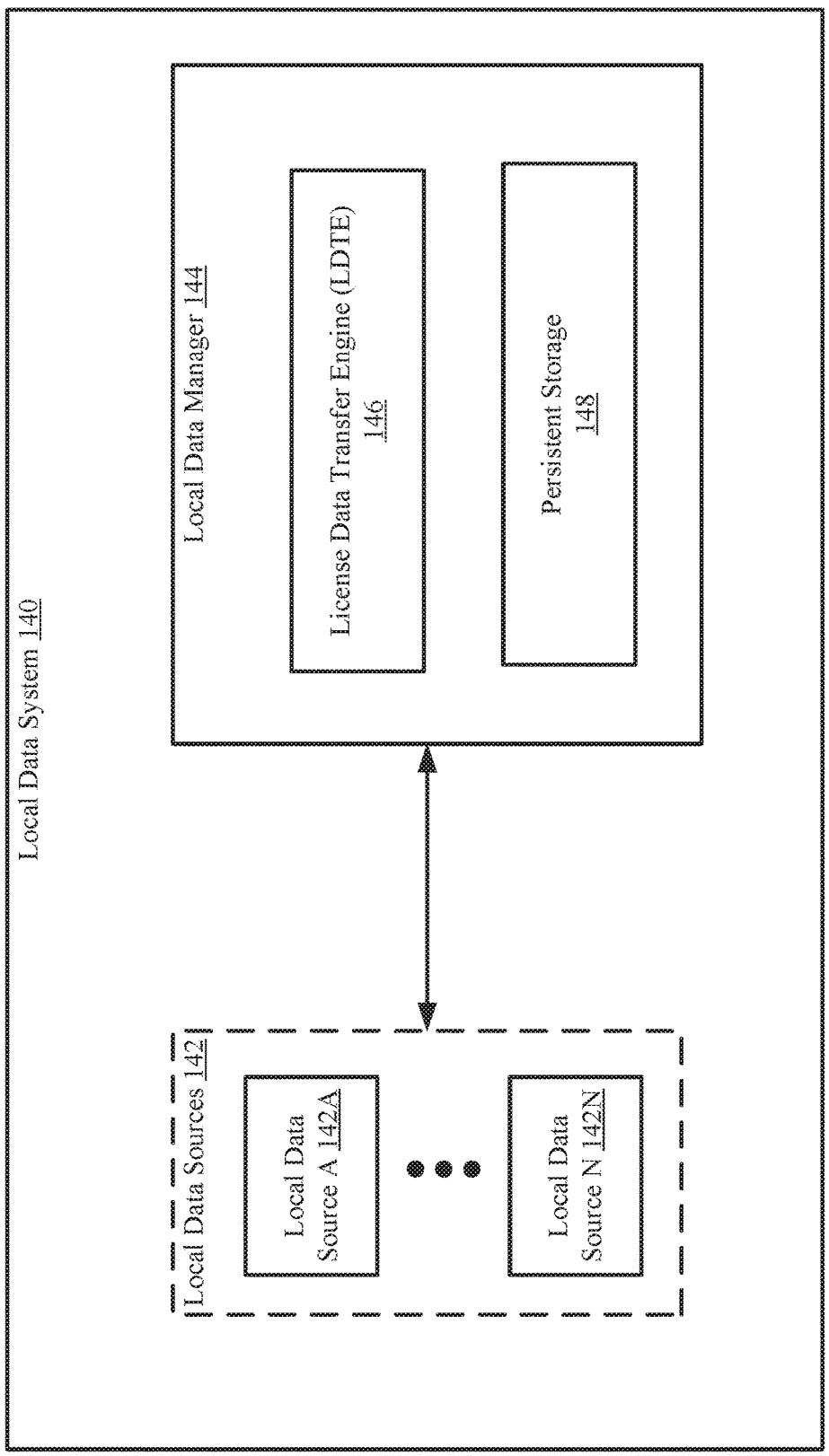
FIG. 1B shows a diagram of a local data system in accordance with one or more embodiments of the invention.

FIG. 1B shows a diagram of a local data system in accordance with one or more embodiments of the invention. The local data system (140) may be similar to a local data system (112, 114) discussed above. As discussed above, the local data system (140) may obtain data, store data, and provide data to a client. To perform the aforementioned functionality, the local data system (140) includes local data sources (142) and a local data manager (144). The local data sources (142) and the local data manager (144) may be operably connected via any combination of wired and/or wireless networks without departing from the invention. The local data system (140) may include additional, fewer, and/or different components without departing from the invention. Each of the aforementioned components is discussed below.

In one or more embodiments of the invention, the local data sources (142) are sources of data obtained from real-world processes. A data source may be, for example, a sensor. The sensor may be a hardware device for supplying data regarding a real-world process. For example, the sensor may be a count sensor that determines the number of items that are present in a particular location. The count sensor may supply the number of items to a database that stores the information on behalf of the count sensor. The sensor may be other types of sensors (e.g., distance sensors, temperature sensors, cameras, audio sensors, etc.) without departing from the invention.

In one or more embodiments of the invention, at least one of the local data sources (142A, 142N) is an Internet of things (IOT) device. For example, one of the data sources (142A) may be a camera operably connected to the Internet and that supplies data via an IOT standard to the local data manager (144). The data may be a video stream of a particular location. Image recognition may be utilized to extract relevant information from the video stream. The relevant information may be supplied to the local data manager (144) in isolation or in combination with the video stream itself.

In one or more embodiments of the invention, the local data manager (144) is a device (e.g., a computing device as shown in FIG. 4) that manages data obtained from the local data sources (142). The local data manager (144) may manage the data by storing the data in persistent storage (148) and/or providing the data to external entities (e.g., clients). The local data manager (144) includes a license data transfer engine (LDTE) (146) and persistent storage (148). The local data manager may include additional, fewer, and/or different components without departing from the invention.

In one or more embodiments of the invention, the LDTE (146) communicates with a data management system (e.g., 100, FIG. 1A) to determine whether to provide data to a client in accordance with a license agreement, which may be stored (or otherwise maintained) by the data management system. The LDTE (146) may determine, based on the communication, whether to provide the data to the client.

In one or more embodiments of the invention, the local data manager (144) provides data to a client by sending a copy of the data to the client. The data may be data stored in the persistent storage (148) and obtained from the local data sources (142).

In one or more embodiments of the invention, the data is provided to the client by allowing the client access to the data using computing resources of the local data manager (144). The client may provide credential information to the local data manager (144). The local data manager (144), based on the credential information, may determine whether to allow the client to access the data from the persistent storage (148) of the local data manager (144). The access may include allowing a client to have read only access of the data, have read/write access to the data, make copies of the data for storage on the client (or in another location external to the local data system), any other access, or any combination thereof, in accordance with a license agreement previously established.

In one or more embodiments of the invention, LDTE (146) is a hardware device including circuitry. The LDTE (146) may be, for example, a digital signal processor, a field programmable gate array, or an application specific integrated circuit. The LDTE (146) may be other types of hardware devices without departing from the invention.

In one or more embodiments of the invention, the LDTE (146) is implemented as computing code stored on a persistent storage that when executed by a processor of the local data manager (144) performs the functionality of the LDTE (146). The processor may be a hardware processor including circuitry such as, for example, a central processing unit or a microcontroller. The processor may be other types of hardware devices for processing digital information without departing from the invention.

The persistent storage (148) may be configured to store data. The persistent storage (148) may be a physical storage. For example, the persistent storage (148) may include hard disk drives, solid state drives, and/or tape drives for storing data. The persistent storage (148) may include other types of non-transitory storage mediums without departing from the invention.

In one or more embodiments of the invention, the persistent storage (148) stores data obtained from the local data sources (142). The data stored in the persistent storage (148) may be provided to clients in accordance with one or more license agreements.

Figure 1C:
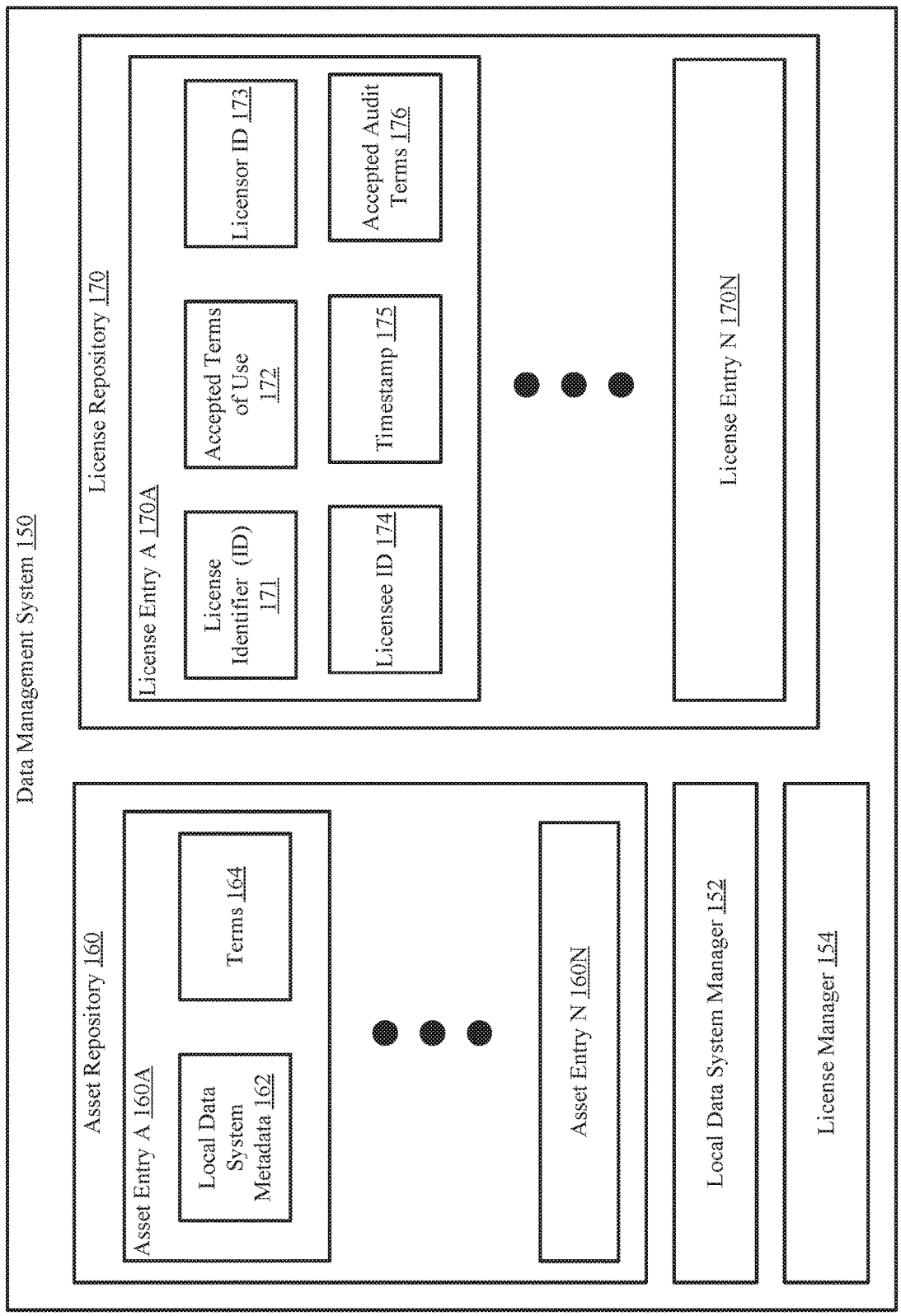
FIG. 1C shows a diagram of a data management system in accordance with one or more embodiments of the invention.

FIG. 1C shows a diagram of a data management system in accordance with one or more embodiments of the invention. The data management system (150) may be similar to the data management system (100, FIG. 1A) discussed above. The data management system (150) may include an asset repository (160), a license repository (170), a local data system manager (152), and a license manager (154). The data management system (150) may include additional, fewer, and/or different components without departing from the invention. Each component of the data management system (150) illustrated in FIG. 1C is discussed below.

In one or more embodiments of the invention, the asset repository (160) includes a number of asset entries (160A, 160N). Each asset entry may include local data system metadata (162), and terms (164). Each asset entry (160A, 160N) may include additional, fewer, and/or different data structures (or content) without departing from the invention. Each data structure illustrated for an asset entry (160A) is discussed below.

In one or more embodiments of the invention, local data system metadata (162) is a data structure that specifies information about one or more local data systems. Information of a local data system may include, for example, a geographical location, types of local data sources (e.g., a type of sensor), metadata about the data stored by the local data system, applications (e.g., algorithms) executable by the local data system, etc. The local data system metadata (162) may include other types of information without departing from the invention. Further, there may be more than one asset entry associated with each local data system.

In one or more embodiments of the invention, the terms (164) specify terms for accessing the local data system. The terms may include, for example, a price and a time window for the access, and a type of access allowed. For example, a term may specify that a local data system is to send a portion of the data stored in the local data system to a client every seven days for 28 days at a price of 50 United States Dollars (USD).

In one or more embodiments of the invention, the data management system includes a license repository (170). The license repository (170) may include a number of license entries (170A, 170N). In one or more embodiments of the invention, each license entry (170A, 170N) is associated with a license agreement. Each license entry (170A, 170N) may include a license ID (171), accepted terms of use (172), a licensor ID (173), a licensee ID (174), a timestamp (175), and accepted audit terms (176). The license entries (170A, 170N) may include additional, fewer, and/or different data structures (or content) without departing from the invention. Each data structure illustrated for a license entry (170A) is discussed below.

In one or more embodiments of the invention, each license entry (170A, 170N) is machine-readable. A license entry that is machine-readable refers to a license entry that is structured in a way wherein each portion of the license entry can be distinguished by a computing device and/or software operating on the computing device. The license entry (170A, 170N) may be structured in an extensible markup language (XML), JavaScript Object Notation (JSON), Hypertext Markup Language (HTML), and/or any other formats that may allow a machine to parse portions of the license entries (170A, 170N) without departing from the invention.

In one or more embodiments of the invention, a license identifier (ID) (171) is a data structure that specifies a license agreement between a client and a licensor. The license ID (171) may be, for example, a string of numbers, letters, symbols, or any combination thereof that uniquely identifies the license entry (170A).

In one or more embodiments of the invention, the accepted terms of use (172) specify terms that have been accepted by the client for this license agreement. The terms may specify, for example, an agreed-upon amount that a client (also referred to a licensee) has paid (or will pay) to obtain the data, data that is to be provided to the client by one or more local data systems (also referred to as licensed data or licensed data set(s)), a time limit in which the local data system(s) may provide the licensed data (e.g., an expiration date), a period of time in which a local data system is to provide the licensed data to a client (e.g., a data set is to be provided to the client once a week for a year), and/or other information that specify terms accepted by the client for the license agreement.

Further, the accepted terms of use (172) specify agreed-upon terms for how the data may be used by the client. For example, the terms of use (172) may specify that the data may only be accessed by a specified list of clients. To comply with this accepted terms of use (172), the client may not send, distribute, or otherwise provide the licensed data to a non-specified entity (e.g., another client). The accepted terms of use (172) may also include other restrictions with respect to how all or a portion of the data may be used without departing from the invention.

In one or more embodiments of the invention, the licensor ID (173) is a data structure that specifies a legal entity that is providing the licensed data to the licensee. In one or more embodiments of the invention, a legal entity is a person, a group of people, a partnership, corporation, any other business entity, or any combination thereof. The legal entity may also be referred to as the licensor. In one or more embodiments of the invention, the legal entity owns the licensed data (or otherwise has rights to license the data) that is being provided. The legal entity may communicate via the data management system to establish the terms with the licensee and provide the licensed data to the licensee using the local data system(s). The licensor ID (173) may be, for example, a string of numbers, letters, symbols, or any combination thereof that uniquely identifies the licensor.

In one or more embodiments of the invention, the licensee ID (174) is a data structure that specifies the licensee, which is also a legal entity. The licensee ID (174) may be, for example, a string of numbers, letters, symbols, or any combination thereof that uniquely identifies the licensee.

In one or more embodiments of the invention, the timestamp (175) is a data structure that specifies a point in time in which the license agreement associated with the license entry came into effect. Alternatively, the timestamp (175) may specify a period of time in which the licensor must comply with the accepted terms (172).

In one or more embodiments of the invention, the accepted audit terms (176) are terms, accepted by the client, that specify when and how a local data system providing the data may audit the client for its data usage. The accepted audit terms (176) may specify a schedule for which the client is to provide documentation that specifies whether the client is complying with the accepted terms of use (172). For example, accepted audit terms may specify that the local data system may audit the data usage once every month, every quarter, bi-annually, yearly, etc. Further, the accepted audit terms (172) may specify that the audit be performed automatically or based on a usage audit request by the local data system.

The accepted audit terms (176) may further specify approved methods for documenting the data usage. For example, the accepted audit terms may specify that the client is to host a data usage manager (discussed in FIG. 1D) that tracks and/or enforces the data usage of the client.

In one or more embodiments of the invention, the local data system manager (152) interfaces with local data systems to enforce license agreements and accepted terms (e.g., 172). The local data system manager (152) may enforce the license agreements by obtaining license verification requests from local data systems that request verification for data that is to be provided to clients by the local data systems. The local data system manager (152) may search the license repository (170) for relevant license entries (170A, 170N) and determine whether the relevant license entries (170A, 170N) specify permitting the local data systems to provide the data to the clients. The local data system manager (152) may communicate with the local data systems based on the determination.

In one or more embodiments of the invention, the license manager (154) communicates with clients to obtain license agreements. The license manager (154) may provide one or more asset entries (160A, 160N) to the clients and, after the clients agree on terms (e.g., 164), the license manger (154) may generate license entries (170A, 170N) based on the license agreements.

Figure 1D:
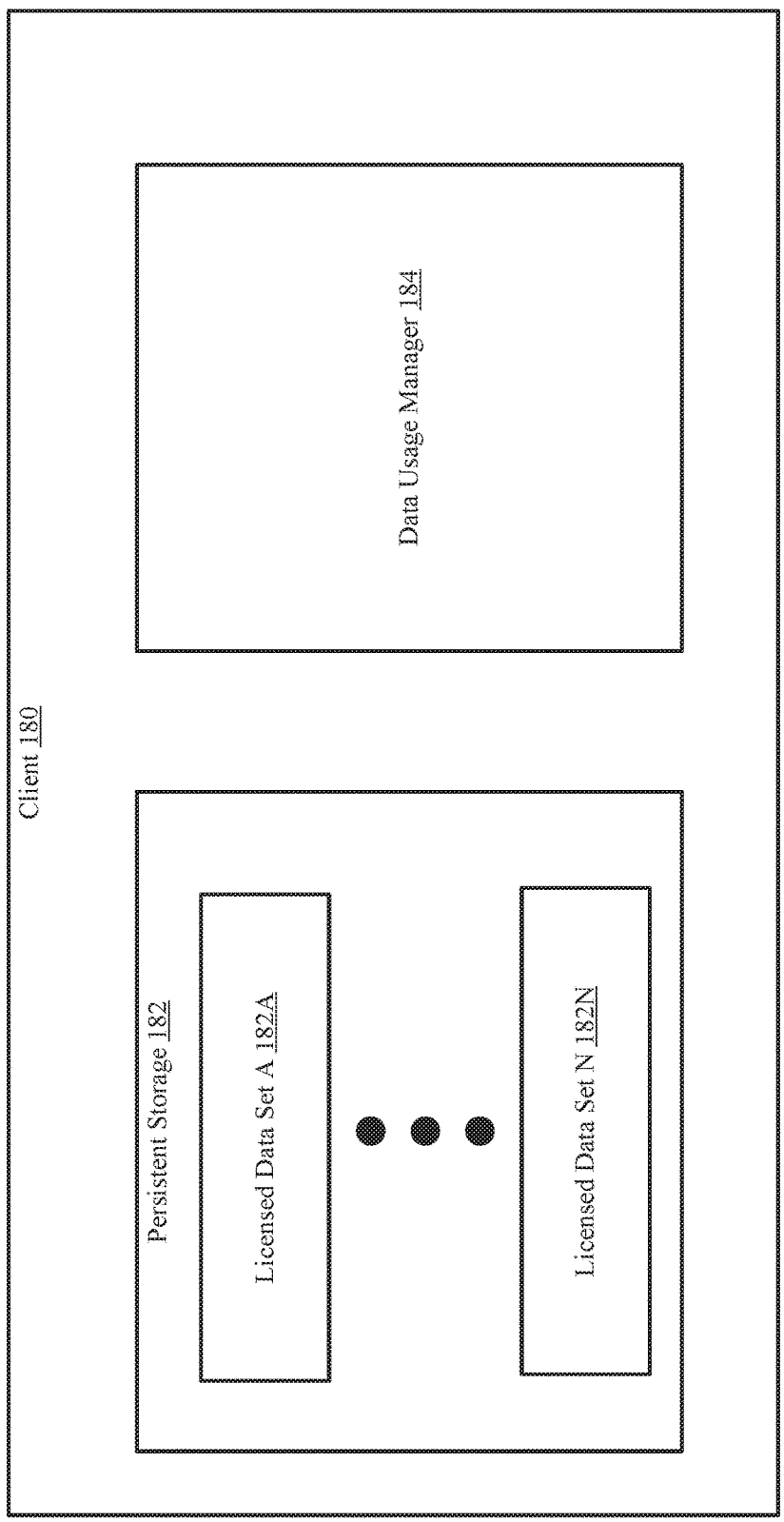
FIG. 1D shows a diagram of a client in accordance with one or more embodiments of the invention.

FIG. 1D shows a diagram of a client in accordance with one or more embodiments of the invention. The client (180) may be similar to a client (122, 124, FIG. 1A) discussed above. As discussed above, the client (180) obtains data from a local data system in accordance with a license agreement, uses the data, and tracks the data usage. To perform the aforementioned functionality, the client (180) includes persistent storage (182) and a data usage manager (184). The client may include additional, fewer, and/or different components without departing from the invention. Each of the aforementioned components is discussed below.

In one or more embodiments of the invention, the persistent storage (182) is configured to store data. The persistent storage (182) may be a physical storage. For example, the persistent storage (182) may include hard disk drives, solid state drives, and/or tape drives for storing data. The persistent storage (182) may include other types of non-transitory storage mediums without departing from the invention.

In one or more embodiments of the invention, the data stored by the persistent storage (182) includes licensed data sets (182A, 182N). Each licensed data set (182A, 182N) is specific data obtained from a local data system. The licensed data sets (182A, 182N) stored in the persistent storage (182) may be used by the client (180) in accordance with a license entry associated with each licensed data set (182A, 182N).

In one or more embodiments of the invention, the data usage manager (184) manages the data usage of the licensed data sets (182A, 182N). The data usage manager may manage the data usage by tracking how the licensed data is used. The data usage may include, for example, providing access to one or more entities (or components within the client) to the licensed data sets (182A, 182N), generating derived data based on a licensed data set (182A, 182N), sending a licensed data set (182A, 182N), or a copy of a licensed data set (182A, 182N) to another entity (e.g., a second client, a component of the client), etc.

Further, the data usage manager (182) may manage the usage of the licensed data sets (182A, 182N) by enforcing accepted terms of use associated with each licensed data set (182A, 182N). The accepted terms of use may be accessed from the data management system and/or stored in memory of the data usage manager (184) without departing from the invention.

For example, a component (not shown) of the client (180) may attempt to transfer a licensed data set to a second client. The data usage manager (184) may intercept the data transfer and determine whether the transfer complies with terms of use associated with the licensed data set and prevent the transfer (or send a notification) if the transfer does not comply with the terms of use. Additional detail about the operation of the data usage manager is provided in FIG. 2D.

Figure 1E:
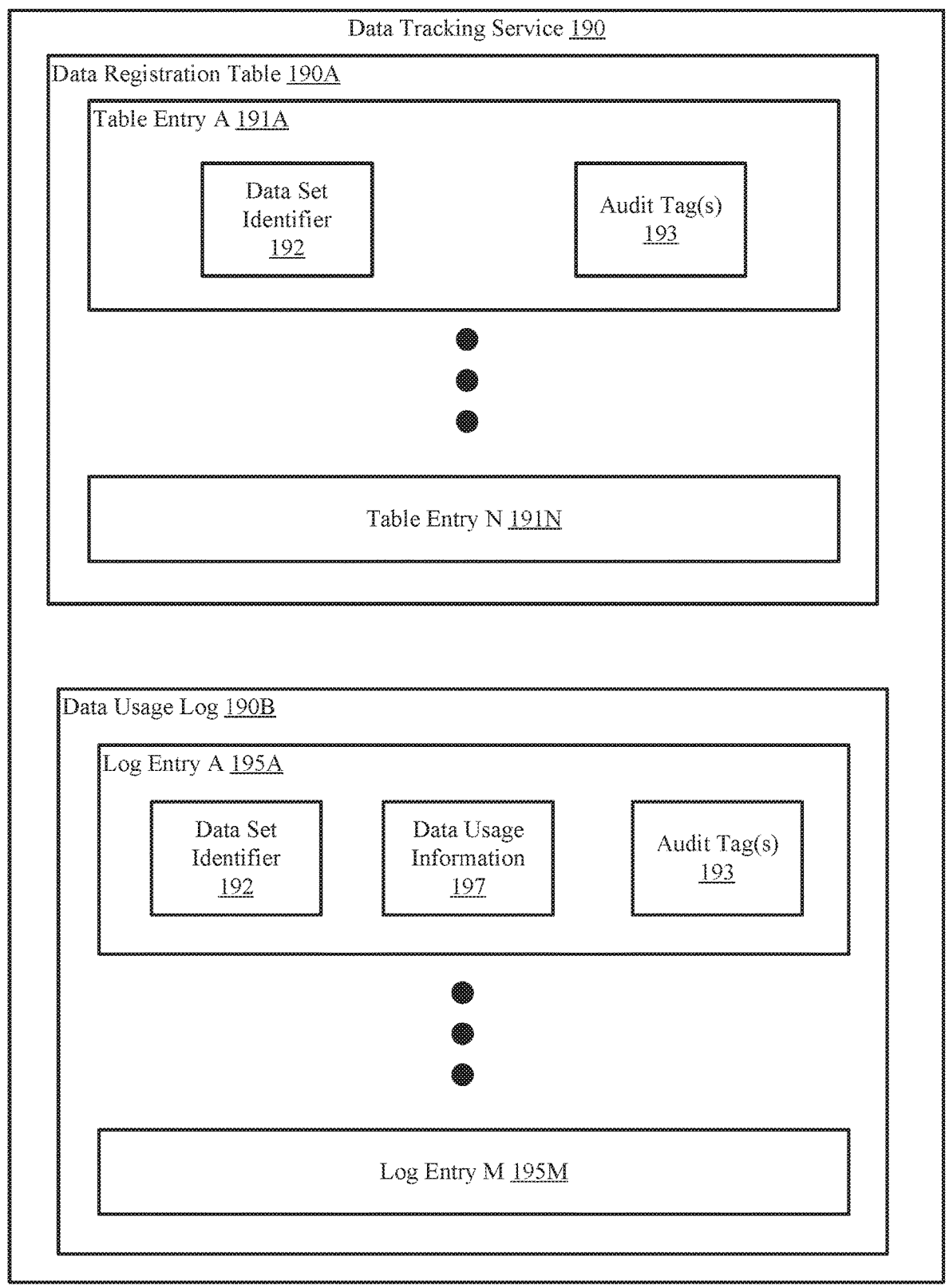
FIG. 1E shows a diagram of a data tracking service in accordance with one or more embodiments of the invention.

FIG. 1E shows a diagram of a data tracking service in accordance with one or more embodiments of the invention. The data tracking service (190) may be similar to the data tracking service (FIG. 1A, 130) discussed above. As discussed above, the data tracking service (190) tracks data usage of licensed data from one or more clients. To provide the aforementioned functionality, the data tracking service (190) includes a data registration table (190A) and a data usage log (190B). The data tracking service (190) may include additional, fewer, and/or different data structures without departing from the invention. Each of the aforementioned data structures is discussed below.

In one or more embodiments of the invention, the data registration table (190A) is a data structure that tracks the licensed data of one or more clients and any audit terms associated with the licensed data. The data registration table (190A) may include one or more table entries (191A, 191N). In one or more embodiments of the invention, each table entry (191A, 191N) is associated with a licensed data set stored or otherwise accessed by a client. Each table entry includes a data set identifier (192) and one or more audit tags (193).

In one or more embodiments of the invention, the data set identifier (192) is a data structure that identifies the licensed data set obtained by the client. The data set identifier (192) may be, for example, a string of numbers, letters, characters, and/or any combination thereof that uniquely identifies the licensed data set.

In one or more embodiments of the invention, the audit tag(s) (193) are data structures that are associated with accepted audit terms and/or accepted terms of use of the licensed data set. The audit tag(s) may be, for example, a string of numbers, letters, characters, and/or any combination thereof that specifies and/or uniquely identifies the accepted terms of use or the accepted audit terms.

In one or more embodiments of the invention, the audit tag(s) (193) may include: (i) the text of the accepted audit terms and/or the accepted terms of use; (ii) a short summary of the accepted audit terms and/or the accepted terms of use (e.g., "monthly auditing", "no external data transfer", etc.), (iii) a link (or reference) to the license agreement, and/or (iv) a link to the specific clauses in the license agreement for the accepted audit terms and/or the accepted terms of use. In this manner, the entity using the audit tag(s) (193) has access to the accepted terms of use and/or the accepted audit terms from the data registration table (190A). The table entries may include different and/or additional information without departing from the invention.

In one or more embodiments of the invention, the data usage log (190B) is a data structure that logs any instances in which data is used. The data usage log (190B) includes log entries (195A, 195M) each associated with an aforementioned instance. Each log entry (195A, 195M) may include a data set identifier (192) (as described above), data usage information (197), and one or more audit tags (193) (as described above). Though not shown in FIG. 1E, each log entry may also include a timestamp. The log entries may include different and/or additional information without departing from the invention.

FIGS. 2A-2F show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2F may be performed in parallel with any other steps shown in FIGS. 2A-2F without departing from the scope of the invention.

FIG. 2A shows a flowchart for obtaining license agreements in accordance with one or more embodiments of the invention. The method shown in FIG. 2A may be performed by, for example, a data management system (100, FIG. 1A). Other components of the system illustrated in FIG. 1A may perform the method of FIG. 2A without departing from the invention.

Turning to FIG. 2A, in step 200, a client request is obtained from a client to use data provided by one or more local data systems. The request may specify the data that the client would like to use and/or a local data system from which the client would like to obtain the data. The request may specify the type of data (at any level of granularity), the type of access to data being requested, any other information, or any combination thereof.

In step 202, one or more asset entries are identified in an asset repository associated with the client request. In one or more embodiments of the invention, the asset entries are identified using the information specified in the client request. The data management system may search the asset repository to identify asset entries where local data system metadata corresponds to data and/or local data systems specified in the client request.

For example, a client request may specify a database stored in a local data system. The data management system may search for asset entries that specify the database in the local data system metadata of the asset entries.

In step 204, terms for the data identified in step 202 are provided to the client based on the identified asset entries. The terms may be terms of use, audit terms, and/or any combination thereof. In one or more embodiments of the invention, the terms are presented to the clients as options (e.g., selections). Each of the terms may be associated with a different asset entry.

In one or more embodiments of the invention, the client makes a selection of one or more terms obtained from the data management system. The client may send (or otherwise provide) the selection of the terms as accepted terms. For example, the client may be presented with a graphical user interface that shows the various terms and that prompts the user of the client to accept the terms, e.g., by clicking a button on the user interface. Any other method for accepting the terms may be used without departing from the invention.

In step 206, acceptance of terms is obtained from the client. The acceptance may be memorialized in a smart contract (as discussed above). The acceptance of terms may result in a license agreement. The license agreement may be stored in a license repository as a license entry by the data management system.

Once the terms are accepted, in step 208, access between the client and one or more local data systems is initiated. In one or more embodiments of the invention, the access is initiated by sending the client credential information (e.g., a username and a password) that allows the client to access agreed-upon data stored in the local data systems. The access may be further initiated by sending the accepted terms to the local data systems. The accepted terms may specify the credential information sent to the client and the licensed data to be accessed by the client.

In one or more embodiments of the invention, the access is initiated by sending the client information for how to access the local data system. The information may be, for example, a connection path that connects the client to a local data manager of the local data system. Other methods for facilitating access to the local data system by the client may be used without departing from the invention.

FIG. 2B shows a flowchart for managing data use operations in accordance with one or more embodiments of the invention. The method shown in FIG. 2B may be performed by, for example, a local data manager (140, FIG. 1B). Other components of the system illustrated in FIG. 1A or FIG. 1B may perform the method of FIG. 2B without departing from the invention.

In step 220, a license verification request is sent to a data management system. In one or more embodiments of the invention, the license verification request may specify a data set to provide to a client. The license verification request may specify the data set and/or the client obtaining and/or otherwise accessing the data. The license verification request may be sent by a license data transfer engine (LDTE) of the local data manager.

In one or more embodiments of the invention, the license verification request is sent in response to a client requesting to obtain and/or otherwise access the data set from the local data system of the local data manager. The local data system may require information about implemented license agreements to determine whether the data set may be provided to the client. The license verification request may be sent in order to obtain the information and/or for the data management system to make the determination.

In step 222, a license verification response is obtained. The license verification response may include a determination made by the data management system about whether the data set is to be provided to the client. Further, if the license verification response specifies that the data set may be provided to the client, the license verification response may include a license agreement (or a license ID) that was used to make the determination to permit the client to obtain the data set.

In step 224, a determination is made about whether the data transfer is permitted. In one or more embodiments of the invention, the data transfer is permitted based on whether the license verification response specifies that the local data system may provide the data set to the client. If the data transfer is permitted, the process proceeds to step 226; otherwise, the process ends (i.e., the data transfer is denied).

In step 226, the data set is sent to the client (or otherwise provided to the client) with one or more audit tags. In one or more embodiments of the invention, the data is sent to the client via a secure connection and/or using digital encryption/signatures. In this manner, only the licensee (i.e., the client) that is intended to obtain the data set is able to access the data set.

In one or more embodiments of the invention, the data set is provided to the client by allowing the client to access the data set from the local data system. For example, the client may provide credential information that would allow the local data system to access the data set. The local data system may determine that the credential information should allow the client to access the data set. The local data system may include functionality for restricting access to other data sets stored in the local data system that are not in accordance with the agreed upon terms.

In one or more embodiments of the invention, the audit tags are generated and associated with the accepted terms. The audit tags may be sent with the data set and/or embedded within the data set that is sent to the client. In one embodiments of the invention, the license agreement associated with the data set is parsed (or otherwise analyzed) to identify the accepted audit terms and/or the accepted terms of use. Once the accepted audit terms and/or the accepted terms of use are identified, the corresponding audit tags are generated. The content of the audit tags may vary based on the implementation of one or more embodiments of the invention (see e.g., above description of audit tags).

FIG. 2C shows a flowchart for managing obtained licensed data in accordance with one or more embodiments of the invention. The method shown in FIG. 2C may be performed by, for example, a client (122, 124, FIG. 1A). Other components of the system illustrated in FIG. 1A may perform the method of FIG. 2C without departing from the invention.

In step 230, a data set is obtained from a local data system. In one or more embodiments of the invention, the data set is stored in a persistent storage of the client.

In step 232, audit tags associated with the obtained data set are identified. In one or more embodiments of the invention, the obtained data set includes the audit tag(s). The audit tag(s) may be obtained from the data set that is tagged with the audit tags. Alternatively, the data set may reference (e.g., using any combination of letters, numbers, and symbols) one or more audit tags. In such embodiments, the referenced audit tags are obtained.

In step 234, a table entry is generated based on the data set and the audit tag(s). In one or more embodiments of the invention, the table entry is generated by obtaining a data set identifier that is associated with the obtained data set. The data set identifier may be embedded within or otherwise associated with the data set. The data set identifier may be stored in the table entry. Further, the identified audit tag(s) may be stored in the table entry.

In step 236, the table entry is sent to the data tracking service. In one or more embodiments of the invention, the data tracking service may store the table entry in the data registration table. The data registration table may be used by the client when managing data usage of the obtained data set. See e.g., FIG. 2D. If the data tracking service is located on the client, then step 236 may include storing the table entry in the data registration table located within the client. Alternatively, if the data tracking service is located externally from the client, then step 236 may include sending the table entry from the client to the data tracking service, where the data tracking service subsequently stores the table entry in the data registration table.

FIG. 2D shows a flowchart for managing data usage of licensed data in accordance with one or more embodiments of the invention. The method shown in FIG. 2D may be performed by, for example, a client (122, 124, FIG. 1A). Other components of the system illustrated in FIG. 1A may perform the method of FIG. 2D without departing from the invention.

In step 240, a data transfer notification for data transfer of a data set is obtained. In one or more embodiments of the invention, the data transfer notification is obtained by a data usage manager of the client. The data transfer notification may specify that a component of the client is attempting to transfer a data set to a separate entity.

In one or more embodiments of the invention, a separate entity is a second computing device (e.g., a second client). The client may attempt to transfer the data via any wired or wireless connection to the second computing device. The data usage manager may intercept the data transfer prior to the data being transferred.

In one or more embodiments of the invention, the second entity is a component of the client. In one or more embodiments of the invention, a client may include two or more components. The data set may be stored in a persistent storage that may be accessed by the components. A component of the client may send a request to the data usage manager to access the data. This request may be deemed to be a data transfer notification.

In step 242, an audit tag associated with the data set is identified. In one or more embodiments of the invention, the audit tag is identified by querying a data registration table of the data tracking service and obtaining a table entry (which includes the audit tags) associated with the data set.

In step 244, a determination is made about whether the audit tag(s) permit (or allow) the data transfer. To make the aforementioned determination, the data usage manager may analyze the audit tags and/or corresponding clauses in the associated license agreement in order to determine whether the transfer is permitted.

If the audit tag specifies allowing the data transfer, the method proceeds to step 246; otherwise, the method ends following step 244 (i.e., the data transfer is not allowed). In one or more embodiments of the invention, if the data transfer is not allowed, the data usage manager may send a notification to the requesting entity (or component of the client) notifying it that the data transfer was not permitted.

In step 246, the data transfer of the data set is allowed. In one or more embodiments of the invention, the data usage manager allows the data set to be sent to the entity (or component) specified in the data transfer notification.

In step 248, a log entry is generated and stored in a data usage log with an audit tag associated with the data. The log entry may specify the data set using a data set identifier, the data usage information (which may specify where the data set was sent), the corresponding audit tags, and a time stamp.

FIG. 2E shows a flowchart for managing license audit requests in accordance with one or more embodiments of the invention. The method shown in FIG. 2E may be performed by, for example, a client (122, 124, FIG. 1A). Other components of the system illustrated in FIG. 1A may perform the method of FIG. 2E without departing from the invention.

Turning to FIG. 2E, in step 260, a usage audit request is obtained from the local data system. In one or more embodiments of the invention, the usage audit request is obtained from a local data system that owns (or otherwise has sufficient rights to license) the licensed data.

In one or more embodiments of the invention, the usage audit request may specify parameters to be searched in the data tracking service. The parameters may include, but are not limited to, one or more data sets, a time window in which data was provided to the client, a license agreement between the client and a licensor, other parameters, and/or any combination thereof.

In step 262, a log request is sent to a data tracking service based on the usage audit request. In one or more embodiments of the invention, the log request specifies the aforementioned parameters included in the usage audit request.

In step 264, a log response is obtained from the data tracking service. In one or more embodiments of the invention, the log request specifies any number of log entries that are associated with the parameters of the log request.

In step 266, a usage audit report is sent to the local data system based on the log response and in response to the usage audit request. In one or more embodiments of the invention, the usage audit report specifies the log entries obtained from the data tracking service.

FIG. 2F shows a flowchart for managing log requests in accordance with one or more embodiments of the invention. The method shown in FIG. 2A may be performed by, for example, a data tracking service (130, FIG. 1A). Other components of the system illustrated in FIG. 1A may perform the method of FIG. 2F without departing from the invention.

Turning to FIG. 2F, in step 280, a log request is obtained. In one or more embodiments of the invention, the log request specifies any number of parameters (discussed above) that may be associated with zero, one or more log entries in the data usage log.

In step 282, one or more log entries associated with the log request are identified. In one or more embodiments of the invention, the log entries are identified using a search query that includes the parameters (i.e., the parameters in the log request) as an input. Any log entries that may be associated with the parameters are identified by the data tracking service.

In step 284, a log response is sent based on the identified log entries. In one or more embodiments of the invention, the log response includes each identified log entry. The log response may be sent to the entity from which the log request was obtained (e.g., the client).

EXAMPLE

Figure 3A:
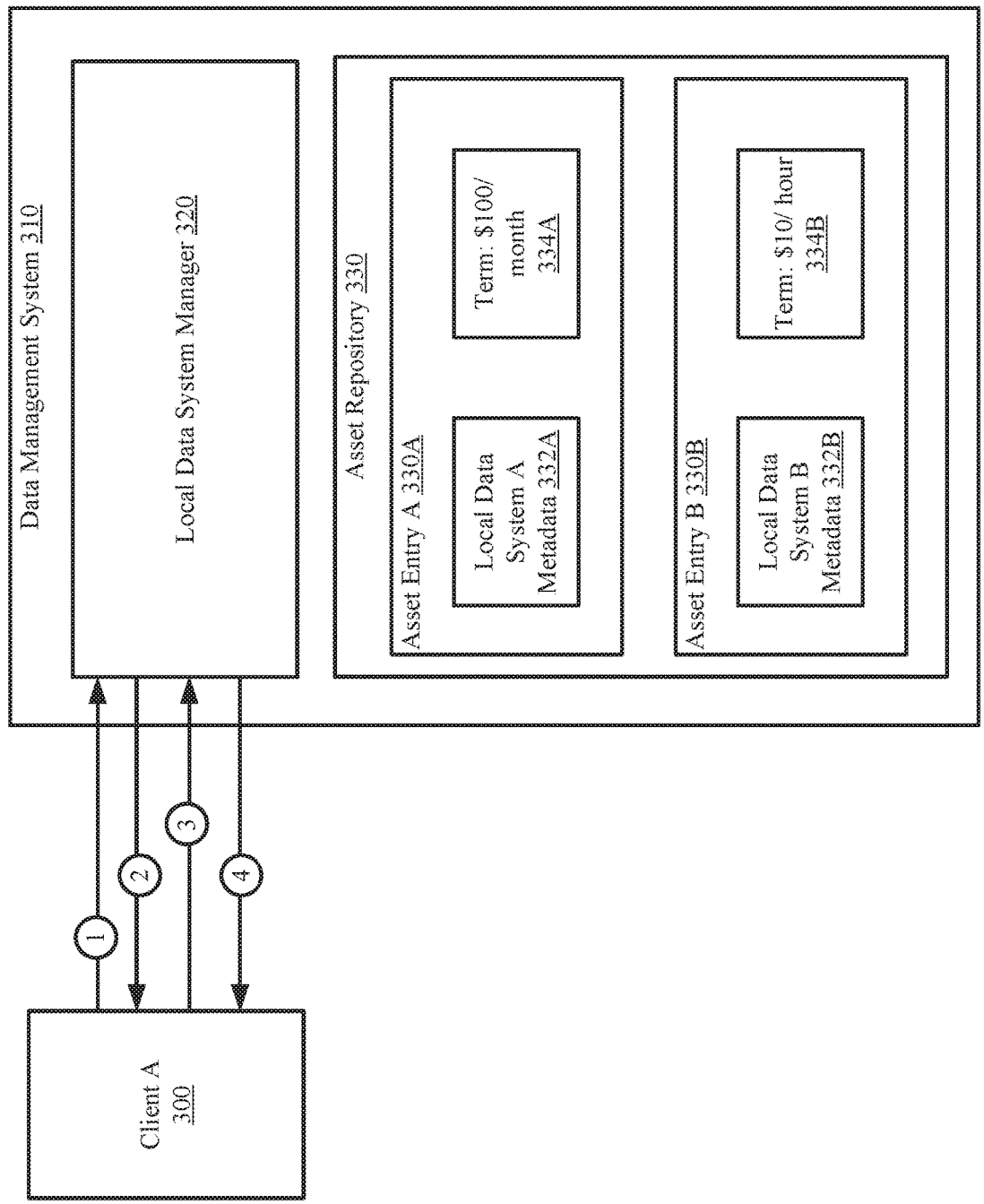
FIGS. 3A-3D show an example in accordance with one or more embodiments of the invention.
Figure 3B:
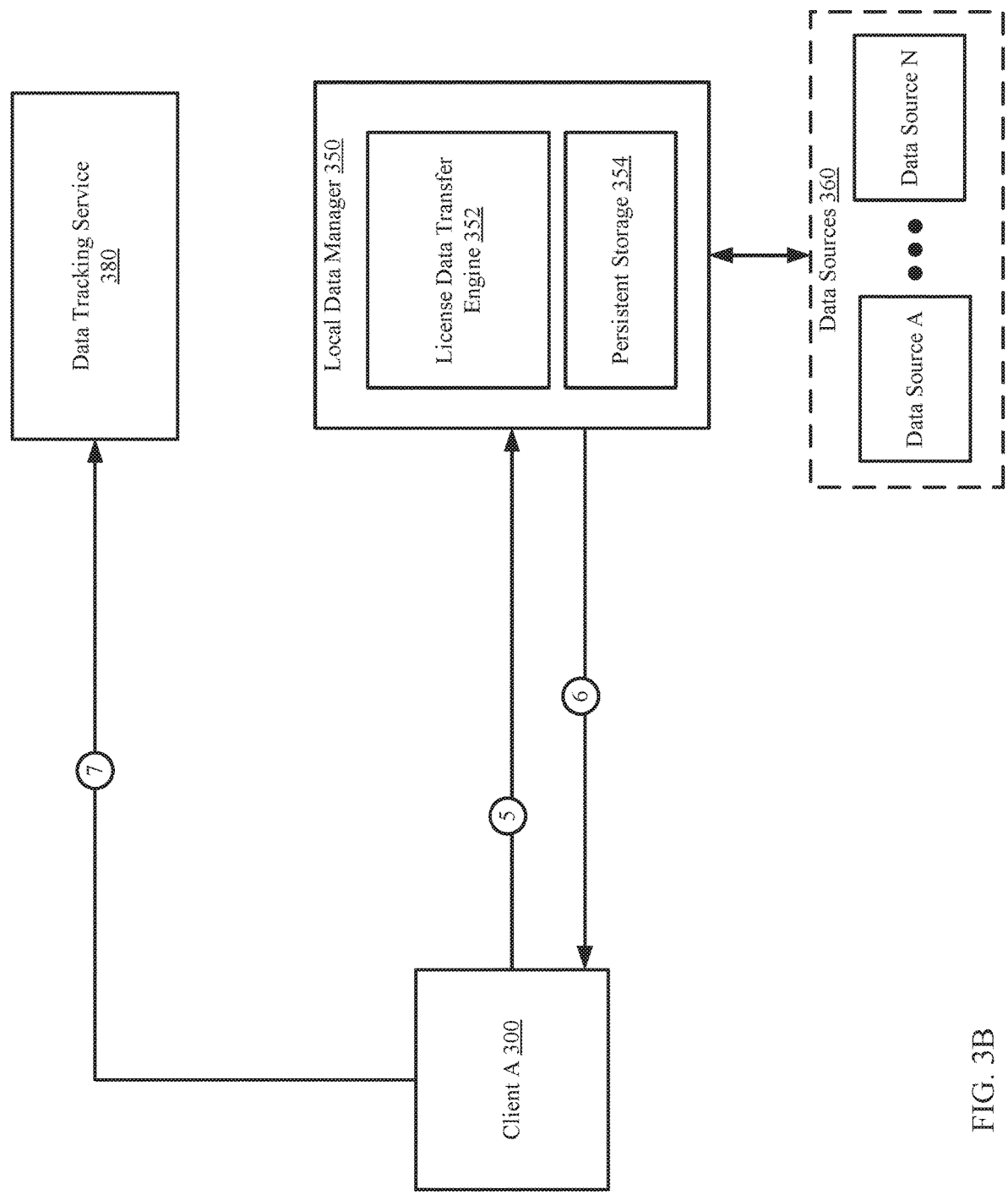
Figure 3C:
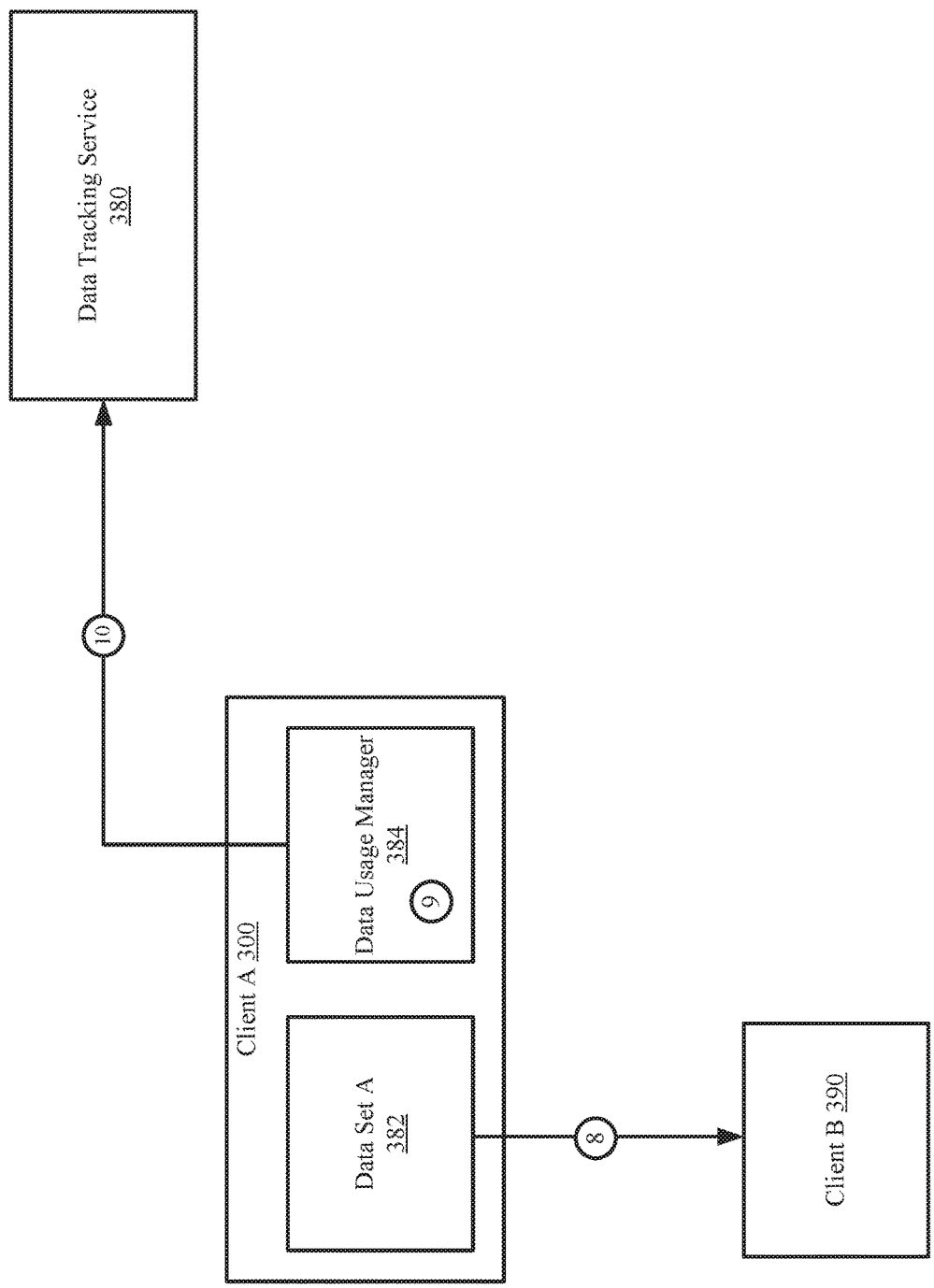

The following section describes an example. The example, illustrated in FIGS. 3A-3C, is not intended to limit the invention. Turning to the example, consider a scenario in which a client would like to obtain data that is locally stored in one or more local data systems. The data may be data streamed to a local data manager by a traffic camera from any geographical location.

FIG. 3A shows an example system in accordance with one or more embodiments of the invention. The system includes a client A (300) communicating with a local data system manager (320) of a data management system (310). The client may send a request to the local data system manager (320) to access data associated with a traffic camera [1]. The local data system manager (320) searches an asset repository (330) of the data management system (310) to identify asset entries (330A, 330B) associated with the requested data. The identified asset entries (330A, 330B) include local data system metadata (332A, 332B) that each specifies a local data system and data sets A and B that are each associated with a traffic camera. The local data system manager (320) sends terms (334A, 334B) associated with the asset entries (330A, 330B) to client A (300) for review by the client A (300) [2].

Client A, after reviewing the terms, selects the term for asset entry A (330A) based on an expected usage of the data. The expected usage may be for a time period of two months. The client A may send the selection to the local data system manager (320) as an acceptance of the selected term [3].

The local data system manager (320), in response to the acceptance of the term, may send access information to the client that specifies how to access the local data system (local data system A) [4]. The access information may be a hyperlink sent via email to the client. The hyperlink provides the client a path for connecting to a local data manager of local data system A. Further, the data management system (310) stores a license entry in a license repository (not shown in FIG. 3A) that specifies client A, the licensor (local data system A), accepted terms that specify the licensed data that is to be provided, and a timestamp.

Client A (300) may provide credential information to the local data manager (350) and send a client request to access data sets A and B stored in persistent storage (354) of the local data manager (350), as seen in FIG. 3B.

The license data transfer engine (352) verifies the credentials of the client A (300) and determines that the client may obtain the data sets. The local data manager (350) sends data set A to the client that includes an audit tag that is associated with accepted terms of use [6]. The terms of use specifies that client A (300) is permitted to provide the data to client B. After obtaining the data set, the client A (300) registers the data set in a data registration table of a data tracking service (380) [7]. The data registration table may include a table entry that includes a data set identifier used to identify data set A and the audit tag.

At a later point in time, a user of client A (300) attempts to provide the data to client B. Turning to FIG. 3C, client A (300) sends a notification to a data usage manager (384) of client A (300) to determine whether the data set (382) may be sent to client B (390). The data usage manager (384), using an audit tag of the data set (382), determines that the data set (382) may be sent to the client B (390) [9]. Client A (300) subsequently sends the data set (382) to client B (390). Further, the data usage manager (384) tracks this data transfer by storing a log entry in the data tracking service (380) associated with the data set (382) and the data usage.

Figure 3D:
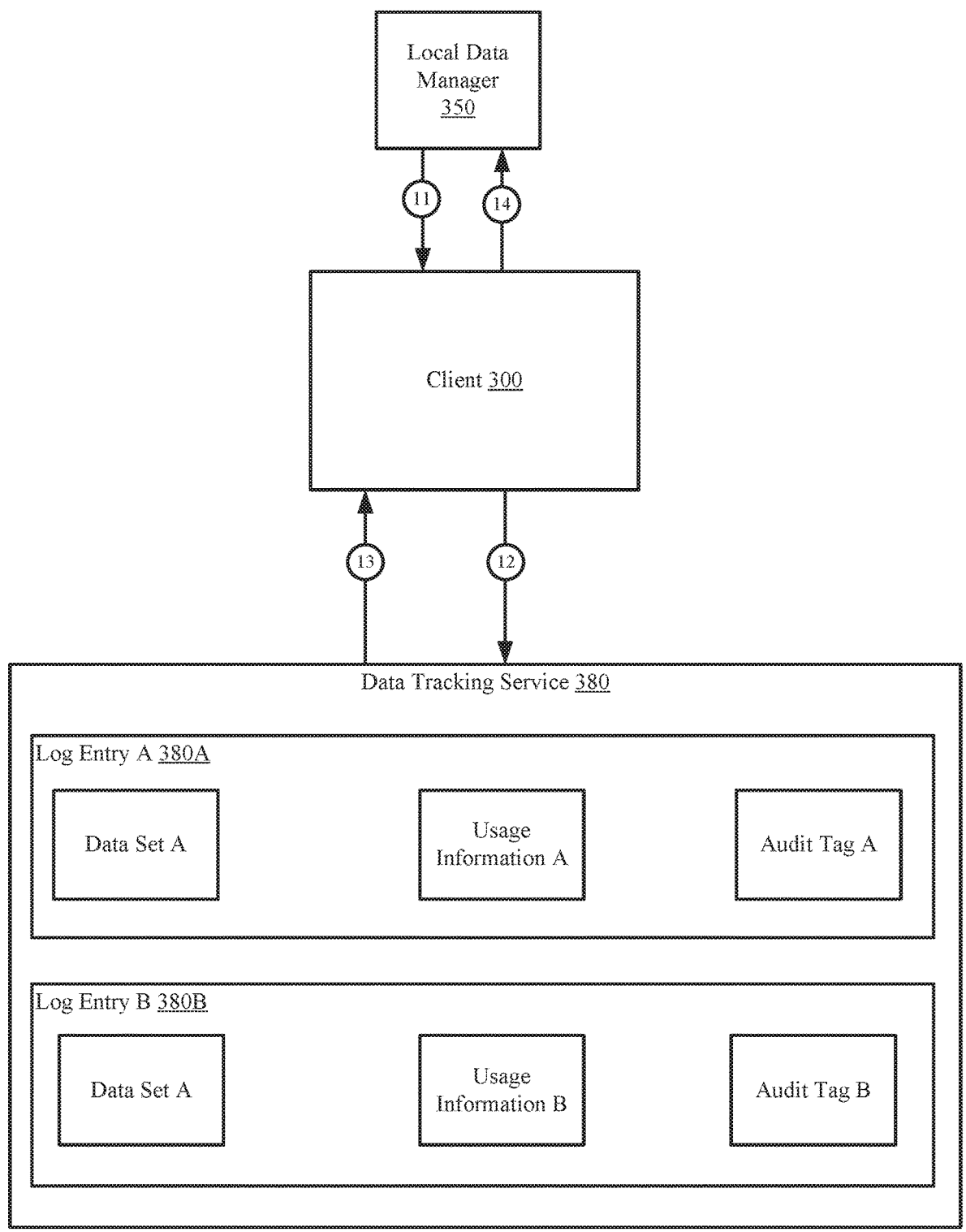

At a later point in time, the local data manager (350) requests to audit client A (300) to identify the data usage of the data set and determine if the data usage complies with the accepted terms. Turning to FIG. 3D, the local data manger (350) sends a usage audit request (350) to client A (300) [11]. The usage audit request specifies data set A and the audit tag associated with the data set.

Client A (300), in response to the usage audit request, sends a log request to the data tracking service (380) [12]. The log request specifies the following parameters: data set A, audit tag A. The data tracking service (380) takes those parameters as inputs to a search query that results in log entries A (380A) and B (380B). The data tracking service (380) sends a log response to client A (300) that specifies the log entries (380A, 380B) [13]. Client A (300) use the log response to generate a license audit report that specifies the log entries and/or the data usage associated with the data set based on the log entries (380A, 380B). Client A (300) sends the license audit report to local data manager (350) [14].

The local data manager (350) uses the license audit report to determine that data set A was used in compliance with the accepted terms and a breach of a license agreement was not committed by the client.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the reliability of providing licensed data to a data purchaser by having the local data systems that store licensed data communicate with a data management system that stores the license agreements. The local data systems may use the communication to determine whether to provide licensed data to the data purchaser even when the license agreement is established in a remote location (e.g., in a cloud-based infrastructure).

Further, embodiments of the invention improve the reliability of providing the licensed data by implementing a data tracking service that stores immutable log entries wherein each log entry specifies an instance in which a data set of licensed data was used by a client (e.g., the data purchaser). Embodiments of the invention may audit the data tracking service to accurately determine how the data was used by client and to allow the client to provide proof that the data was used in compliance with accepted terms of the license agreement.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
obtaining, by a client licensing a data set, the data set from a local data system;
identifying an audit tag associated with the data set;
generating a table entry for a data registration table based on the data set and the audit tag;
storing the table entry in the data registration table, wherein the data registration table is stored in a data tracking service operatively connected to the client;
after storing the table entry:
obtaining a data transfer notification for transfer of the data set to a second client;
identifying the audit tag associated with the data set;
making a determination, based on the audit tag, that the transfer of the data set is allowed;
transferring the data set to the second client, based on the determination;
generating a log entry based on the allowing of the transfer and based on the audit tag, wherein the log entry is stored in a data usage log of the data tracking service;
obtaining, after generating the log entry, a usage audit request from the local data system;
in response to the usage audit request:
sending a log request to the data tracking service;
obtaining a log response based on the log request; and
sending a data usage report to the local data system based on the log response.

2. The method of claim 1, wherein the log entry comprises a data set identifier, data usage information, and the audit tag.

3. The method of claim 1, wherein the audit tag is associated with accepted audit terms associated with the data set.

4. The method of claim 3, wherein the accepted audit terms are stored in a license entry of a data management system operatively connected to a data tracking system.

5. The method of claim 4, wherein the license entry is stored in a machine-readable format.

6. A non-transitory computer readable medium comprising computer readable program code, which when executed by a computer processor enables the computer processor to perform a method, the method comprising:
obtaining, by a client licensing a data set, the data set from a local data system;
identifying an audit tag associated with the data set;
generating a table entry for a data registration table based on the data set and the audit tag;
storing the table entry in the data registration table, wherein the data registration table is stored in a data tracking service operatively connected to the client; and
after storing the table entry:
obtaining a data transfer notification for transfer of the data set to a second client;

identifying the audit tag associated with the data set;
making a determination, based on the audit tag, that the transfer of the data set is allowed;
transferring the data set to the second client, based on the determination;
generating a log entry based on the allowing of the transfer and based on the audit tag, wherein the log entry is stored in a data usage log of the data tracking service;
obtaining, after generating the log entry, a usage audit request from the local data system; and
in response to the usage audit request:
sending a log request to the data tracking service;
obtaining a log response based on the log request; and
sending a data usage report to the local data system based on the log response.

7. The non-transitory computer readable medium of claim 6, wherein the log entry comprises a data set identifier, data usage information, and the audit tag.

8. The non-transitory computer readable medium of claim 6 wherein the audit tag is associated with accepted audit terms associated with the data set.

9. The non-transitory computer readable medium of claim 8, wherein the accepted audit terms are stored in a license entry of a data management system operatively connected to a data tracking system.

10. The non-transitory computer readable medium of claim 9, wherein the license entry is stored in a machine-readable format.

11. A system, comprising:
a processor;
memory comprising instructions, which when executed by the processor, perform a method, the method comprising:
obtaining, by a client licensing a data set, the data set from a local data system;
identifying an audit tag associated with the data set;
generating a table entry for a data registration table based on the data set and the audit tag;
storing the table entry in the data registration table, wherein the data registration table is stored in a data tracking service operatively connected to the client,
after storing the table entry:
obtaining a data transfer notification for transfer of the data set to a second client,
identifying the audit tag associated with the data set;
making a determination, based on the audit tag, that the transfer of the data set is allowed;
transferring the data set to the second client, based on the determination;
generating a log entry based on the allowing of the transfer and based on the audit tag, wherein the log entry is stored in a data usage log of the data tracking service;
obtaining, after generating the log entry, a usage audit request from the local data system; and
in response to the usage audit request:
sending a log request to the data tracking service;
obtaining a log response based on the log request; and
sending a data usage report to the local data system based on the log response.

12. The system of claim 11, wherein the log entry comprises a data set identifier, data usage information, and the audit tag.

13. The system of claim 11, wherein the audit tag is associated with accepted audit terms associated with the data set.

14. The system of claim 13, wherein the accepted audit terms are stored in a license entry of a data management system operatively connected to a data tracking system.

* * * * *